United States Patent [19]
Celi, Jr.

[11] Patent Number: 5,404,524
[45] Date of Patent: Apr. 4, 1995

[54] SYSTEM FOR IDENTIFYING ATTACHED INPUT POINTING DEVICES, LOADING ASSOCIATED SOFTWARE ROUTINES, AND INTERACTING WITH ANYONE INPUT POINTING DEVICE WHILE DISABLING THE OTHERS

[75] Inventor: Joseph Celi, Jr., Boynton Beach, Fla.

[73] Assignee: International Business Machines Corporation, Armonk, N.Y.

[21] Appl. No.: 862,681

[22] Filed: Apr. 3, 1992

[51] Int. Cl.⁶ ............................................. G06F 11/00
[52] U.S. Cl. .................................... 395/700; 395/500; 364/234.3; 364/280.2; 364/281.7; 364/DIG. 1
[58] Field of Search ............... 395/275, 375, 600, 650, 395/500, 700; 340/706, 707, 708, 709, 710; 364/234.3, 280.2, 281.7

[56] References Cited

U.S. PATENT DOCUMENTS

| | | | |
|---|---|---|---|
| 4,589,063 | 5/1986 | Shah et al. | 364/200 |
| 4,689,761 | 8/1987 | Yurchenco | 364/708 |
| 4,722,054 | 1/1988 | Yoroza et al. | 364/401 |
| 4,736,374 | 4/1988 | Kump et al. | 371/15.1 |
| 4,884,068 | 11/1989 | Matheny et al. | 345/1 |
| 4,897,801 | 1/1990 | Kazama et al. | 364/521 |
| 4,998,199 | 3/1991 | Tashiro et al. | 364/410 |
| 5,047,754 | 10/1991 | Akatsuka et al. | 364/200 |
| 5,060,149 | 11/1991 | Flurry et al. | 364/200 |
| 5,157,384 | 10/1992 | Greanias et al. | 340/706 |
| 5,179,666 | 1/1993 | Rimmer et al. | 395/275 |
| 5,214,761 | 5/1993 | Barrett et al. | 395/275 |
| 5,317,695 | 5/1994 | Celi, Jr. | 395/275 |

OTHER PUBLICATIONS

"Understanding Device Drivers in Operating System/2," by A. M. Mizell, IBM Systems Journal, vol. 27, No. 2, 1988.
Patent No. J02245858, Registered Oct. 10, 1990, by Wataru Kikuchi, et al, Sect. P., Section No. 1145; vol. 14, No. 574, p. 46, Dec. 20, 1990.
"System for Controlling Plural Mouse Cursors," Patent No. J02201623, Registered Aug. 9, 1990, by Mitsuru Mishiura, Sect. P., Section No. 1123; vol. 14, No. 494, p. 76, Oct. 26, 1990.

Primary Examiner—Thomas C. Lee
Assistant Examiner—Moustafa M. Meky
Attorney, Agent, or Firm—Stephen A. Terrile; Lisa L. B. Yociss; Andrew J. Dillon

[57] ABSTRACT

A method and system for permitting simultaneous communication between a data processing system and input pointing devices of multiple types. During the initialization of an operating system, each input pointing device which is coupled to a data processing system is automatically identified. Thereafter, in response to each input from any one of the identified input pointing devices, a particular software routine is automatically selected, thus permitting each identified input pointing device to communicate with the data processing system.

7 Claims, 3 Drawing Sheets

SYSTEM FOR IDENTIFYING ATTACHED INPUT POINTING DEVICES, LOADING ASSOCIATED SOFTWARE ROUTINES, AND INTERACTING WITH ANYONE INPUT POINTING DEVICE WHILE DISABLING THE OTHERS

CROSS-REFERENCE TO RELATED APPLICATION

The present application is related to U.S. patent application Ser. No. 07/862,670, now U.S. Pat. No. 5,317,695, entitled "Method and System for Permitting Communication Between a Data Processing System and Input Pointing Devices of Multiple Types," filed of even date herewith by the inventor hereof and assigned to the assignee herein.

BACKGROUND OF THE INVENTION

1. Technical Field

The present invention relates in general to the field of data processing systems and in particular to methods and systems for permitting simultaneous communication between a data processing system and a plurality of input pointing devices of different types. Still more particularly, the present invention relates to methods and systems for automatically selecting a particular software routine in response to each input from any one of the identified input devices which are coupled to the data processing system.

2. Description of the Related Art:

Modern state-of-the-art personal computers, such as the International Business Machines Corporation Personal System/2, are capable of communicating with multiple types of input pointing devices, which may include mice, track balls, pointing sticks, and touch display screens. These devices permit a user to manipulate objects on a computer display screen in an intuitive graphical manner rather than by typing computer commands on a computer keyboard.

Such input pointing devices may be capable of performing many different functions and therefore may have different characteristics. Alternately, different manufacturers produce input devices which are capable of performing similar functions, but which have different characteristics. In order to communicate with such a device, the personal computer needs to include a specific software routine, commonly referred to as a device driver, which is configured for the device's unique characteristics.

Known data processing systems may include more than one input pointing device physically coupled to the personal computer. However, these systems permit only one device driver to be installed at a time, thus limiting a user to only one input pointing device. If a user wished to utilize other input pointing devices that may be coupled to the system, the user must terminate the application software currently being accessed. The user must then modify a configuration file which contains the information regarding peripheral devices coupled to the system and reinitialize the operating system before the new input pointing device will be functional. Thereafter, the user may again access an application and begin utilizing the new input pointing device. This process is necessary each time a user wishes to utilize a different input pointing device.

Therefore, a need exists for a method and system whereby a user may couple more than one input pointing device to a personal computer system and utilize each input pointing device without the need to terminate the current application software, modify a configuration file and reinitialize an operating system.

SUMMARY OF THE INVENTION

It is therefore one object of the present invention to provide an improved method and system for permitting simultaneous communication between a data processing system and a plurality of input pointing devices of different types.

It is another object of the present invention to provide an improved method and system for automatically identifying each input pointing device which is coupled to a data processing system.

It is yet another object of the present invention to provide an improved method and system for automatically selecting a particular software routine in response to each input from any one of the identified input devices which are coupled to the data processing system The foregoing objects as achieved as is now described. A method and system are disclosed for permitting simultaneous communication between a data processing system and a plurality of input pointing devices of multiple types. During the initialization of an operating system, each input pointing device which is coupled to a data processing system is automatically identified. Thereafter, in response to each input from any one of the identified input pointing devices, a particular software routine is automatically selected, thus permitting each identified input pointing device to communicate with the data processing system.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
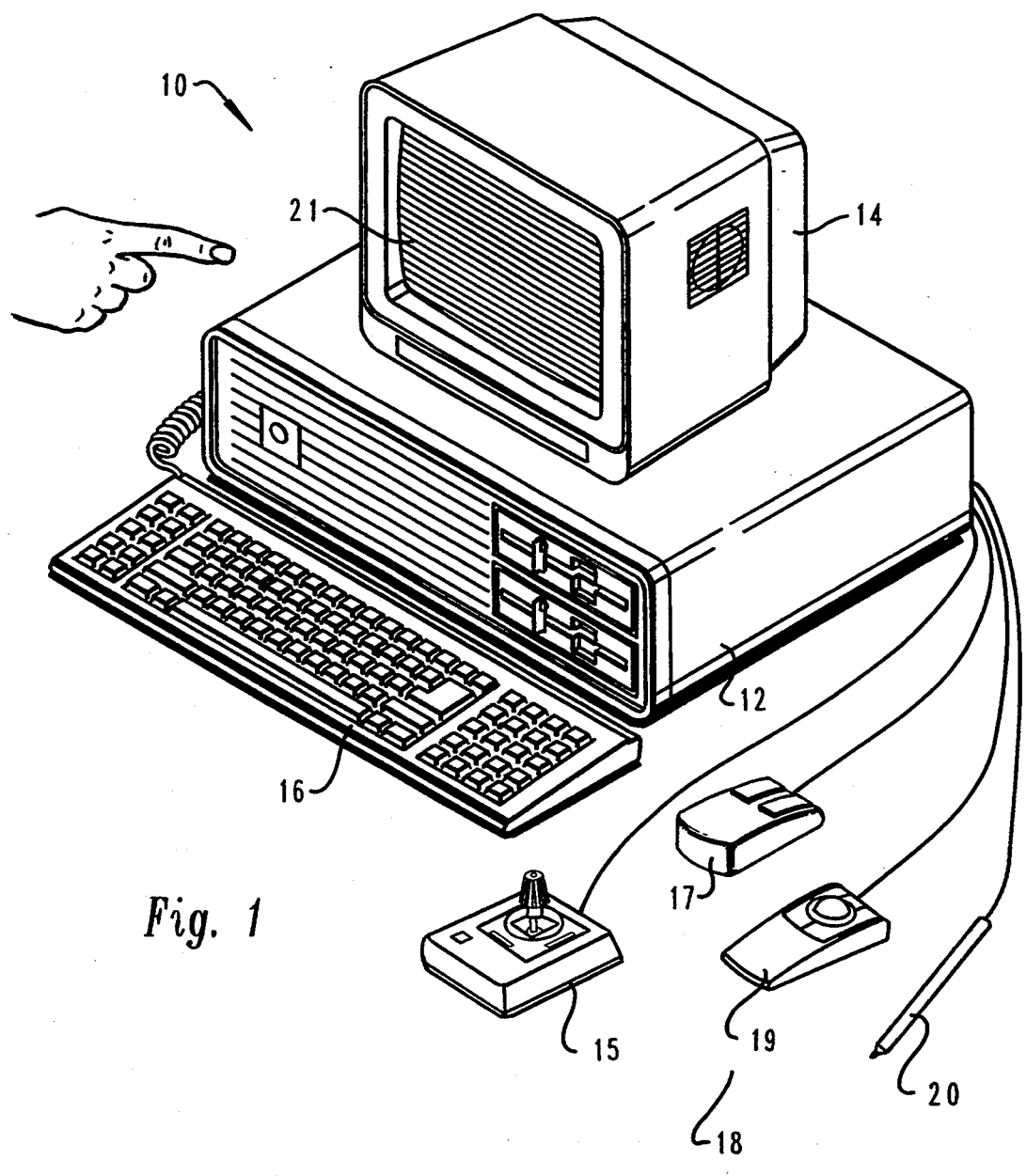
FIG. 1 depicts a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. Personal computer system 10 includes a computer 12, computer display screen 14, keyboard 16, and multiple input pointing devices 18. Those skilled in the art will appreciate that input pointing devices 18 may be implemented utilizing a pointing stick 15, a mouse 17, a track ball 19, a pen 20, touch display screen 21, or any other device that permits a user to manipulate objects in a graphical manner on computer display screen 14.

Figure 2:
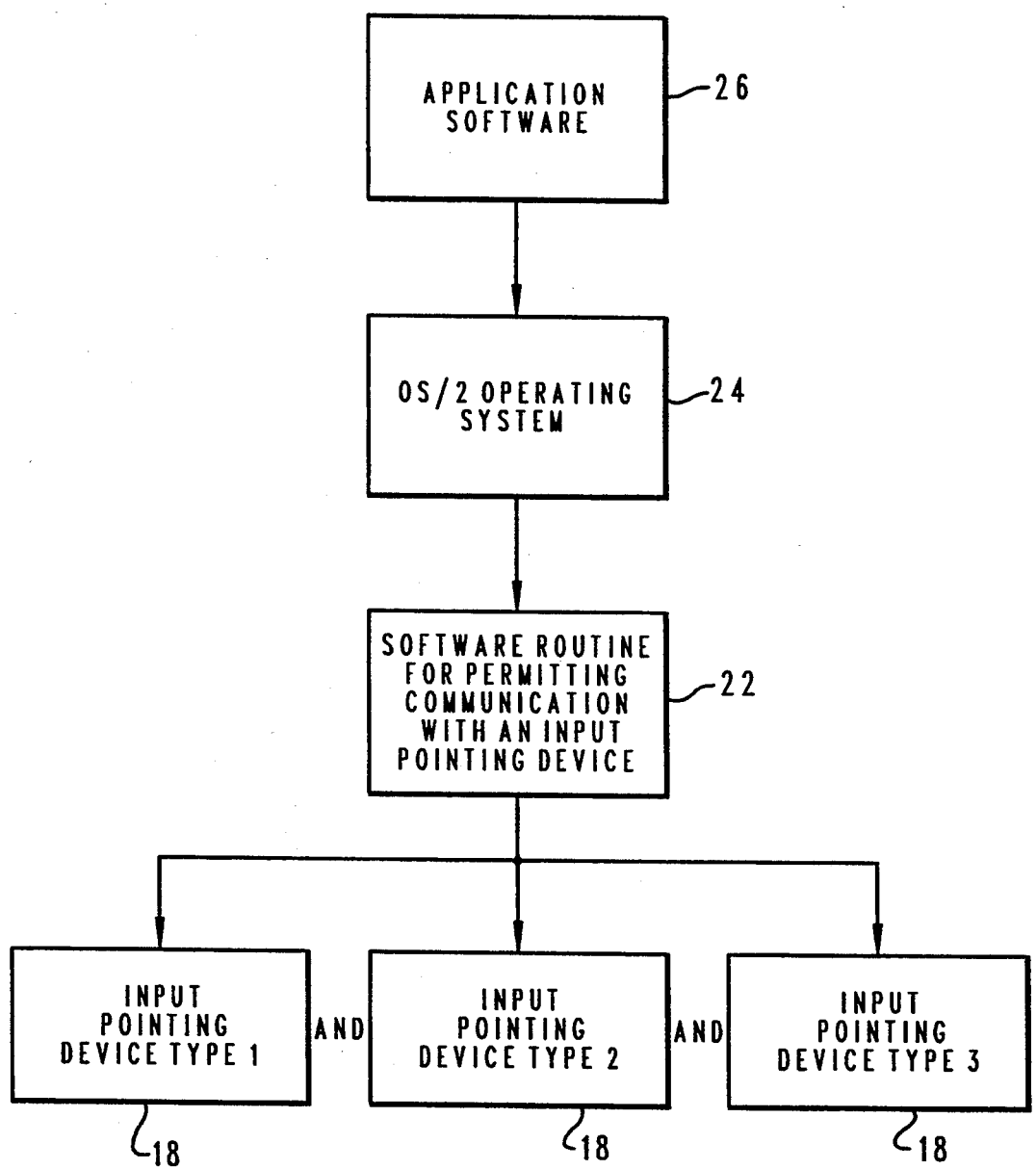
FIG. 2 depicts a pictorial representation of the relationships among software routines which may be utilized to implement the method and system of the present invention.

Referring now to FIG. 2, there is depicted a pictorial representation of the relationships among input pointing devices 18, a software routine 22 for permitting communication between input pointing devices 18 and an operating system 24, and application software 26 which a user may wish to access utilizing an input pointing device 18. Application software 26 may comprise a word processing program, spreadsheet, computer game or any other software application which may be accessed utilizing an input pointing device. In order to access application software 26, commands typed on keyboard 16 or functions selected by manipulating an input pointing device 18 must be received by operating system 24, included within personal computer system 10.

Software routine 22 preferably includes information regarding characteristics of the type of input pointing device 18 which is coupled to personal computer system 10, thus permitting operating system 24 to receive the input commands. Operating system 24 may then interpret such commands and translate those commands into a format that can be readily understood by application software 26.

Figure 3:
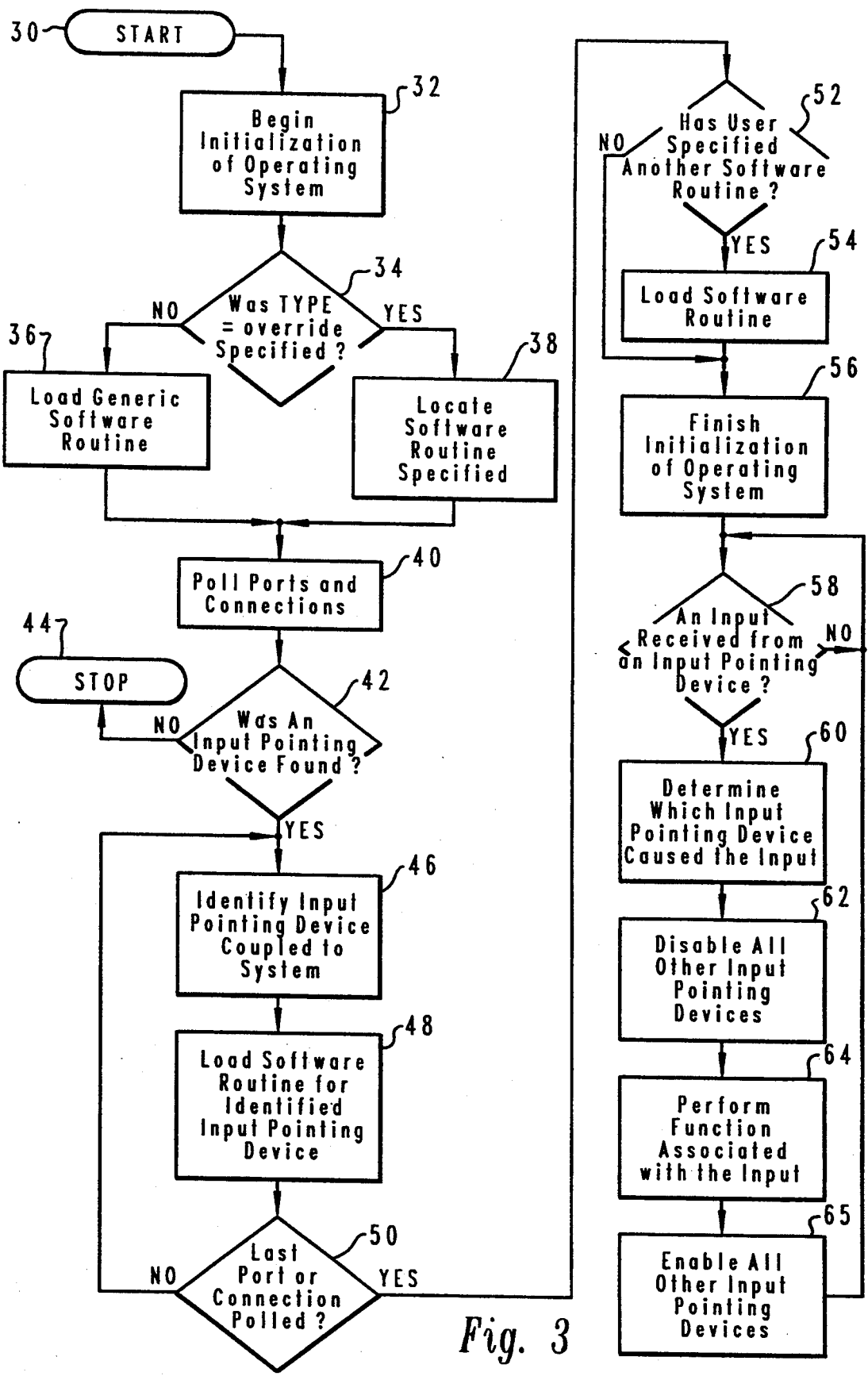
FIG. 3 depicts a high level flow chart illustrating the automatic selection of a plurality of software routines for permitting communication between input pointing devices and a personal computer system.

With reference now to FIG. 3, there is depicted a high level flow chart which illustrates the automatic selection of a plurality of software routines 22 for permitting communication between input pointing devices 18 and a personal computer system 10. The process begins at block 30 and thereafter passes to block 32 which depicts the beginning of the initialization of operating system 24. Next, block 34 illustrates a determination of whether or not a "TYPE=override" statement was specified within a configuration file. This configuration file is typically utilized during the initialization of an operating system in order to specify various software routines which may be required in order to communicate with input pointing devices, as well as other devices which may be coupled to personal computer system 10.

If a determination is made that a "TYPE=override" statement was not specified within the configuration file, the process passes to block 36 which depicts the loading of a generic software routine. Referring again to block 34, if a determination is made that a "TYPE=override" statement was specified within the configuration file, the process passes to block 38, which illustrates locating the software routine specified in the "TYPE=override" statement.

Thereafter, the process passes to block 40 which depicts the polling of all ports and connections within personal computer system 10 to determine whether or not any input pointing devices are coupled to personal computer system 10. Next, block 42 illustrates a determination of whether or not an input pointing device was found during the polling process. If a determination is made that an input pointing device was not found, the process then terminates, as depicted at block 44.

Referring again to block 42, if a determination is made that an input pointing device was found, the process passes to block 46 which illustrates the identification of the input pointing device which was found coupled to personal computer system 10. The process then passes to block 48 which depicts the loading of a software routine associated with the identified input pointing device. Thereafter, the process passes to block 50 which illustrates a determination of whether or not the last port or connection within personal computer system 10 has been polled.

If a determination is made that the last port or connection has not been polled, the process passes back to block 46 to continue polling for additional input pointing devices. Referring again to block 50, if a determination is made that the last port or connection has been polled, the process passes to block 52 which depicts a determination of whether or not a user has specified another software routine. Some input pointing devices may not respond to the process of polling. Therefore, a user may wish to specify a software routine in order for the input pointing device associated with that software routine to be utilized.

If a determination is made that a user has specified another software routine, the process passes to block 54 which illustrates the loading of the other specified software routine. Referring again to block 52, if a determination is made that a user has not specified another software routine, the process passes to block 56 which depicts the completion of the initialization of operating system 24.

Next, the process passes to block 58 which illustrates a determination of whether or not an input has been received from an identified input pointing device. If a determination is made that an input has not been received, the process iterates until such time as an input is received. Referring again to block 58, if a determination is made that an input has been received, the process passes to block 60 which illustrates the determination of which identified input pointing device originated the input.

Thereafter, the process passes to block 62 which depicts the disabling of all other input pointing devices. The process then passes to block 64 which illustrates the performance of a function which is associated the received input. Next, the process passes to block 65 which depicts the enabling of all other input pointing devices. The process then passes back to block 58.

In this manner the method and system of the present invention may be utilized to automatically select a particular software routine in response to an input from any identified input pointing device which is coupled to personal computer system 10. Therefore, identified input pointing devices may be coupled to and communicate with personal computer system 10.

While the invention has been particularly shown and described with reference to a preferred embodiment, it will be understood by those skilled in the art that various changes in form and detail may be made therein without departing from the spirit and scope of the invention.

I claim:

1. A method in a data processing system for permitting simultaneous communication between said data processing system and a plurality of input pointing devices of multiple types, wherein said data processing system includes an operating system and a plurality of software applications, said method comprising the steps of:

providing a plurality of software routines within said data processing system for permitting communication between said plurality of input pointing devices and said plurality of software applications within said data processing system, wherein for each of said plurality of input pointing devices a particular one of said plurality of software routines is utilized for permitting said each of said plurality of input pointing devices to communicate with any of said plurality of software applications;

during initialization of said operating system, automatically polling said data processing system in order to identify each of a plurality of input pointing devices coupled to said data processing system; automatically loading a particular one of said plurality of software routines, in response to identifying each of a plurality of input devices coupled to said data processing system, when said particular one of said plurality of software routines corresponds to an identified one of said plurality of input pointing devices coupled to said data processing system; automatically selecting a particular one of said plurality of software routines, in response to each input from any one of said identified plurality of input pointing devices, wherein each of said identified plurality of input pointing devices may communicate with said data processing system; disabling all other input pointing devices among said identified plurality of input pointing devices coupled to said data processing system in response to an input from any one of said identified plurality of input pointing devices; performing a function associated with said input from said any one of said identified plurality of input pointing devices coupled to said data processing system using said selected software routine; and thereafter enabling all other input pointing devices among said identified plurality of input pointing devices coupled to said data processing system.

2. A data processing system for permitting simultaneous communication between said data processing system and a plurality of input pointing devices of multiple types, wherein said data processing system includes an operating system and a plurality of software applications, said data processing system comprising:
   means for providing a plurality of software routines within said data processing system for permitting communication between said plurality of input pointing devices and said plurality of software applications within said data processing system, wherein for each of said plurality of input pointing devices the same one of said plurality of software routines is utilized for permitting said each of said plurality of input pointing devices to communicate with any of said plurality of software applications;
   means for automatically polling said data processing system in order to identify each of a plurality of input pointing devices coupled to said data processing system, during initialization of said operating system;
   means for automatically loading a particular one of said plurality of software routines, in response to automatically identifying each of a plurality of input pointing devices coupled to said data processing system, wherein said particular one of said plurality of software routines corresponds to an identified one of said plurality of input pointing devices coupled to said data processing system;
   means for automatically selecting a particular one of said plurality of software routines, in response to each input from any one of said identified plurality of input pointing devices, wherein each of said identified plurality of input pointing devices may communicate with said data processing system;
   means for disabling all other input pointing devices among said identified plurality of input pointing devices coupled to said data processing system in response to an input from any one of said identified plurality of input pointing devices; means for performing a function associated with said input from said any one of said identified plurality of input pointing devices coupled to said data processing system using said selected software routine; and means for enabling of all other input pointing devices among said identified plurality of input pointing devices coupled to said data processing system.

3. The data processing system for permitting simultaneous communication between said data processing system and a plurality of input pointing devices of multiple types according to claim 2, wherein said plurality of input pointing devices of multiple types includes a mouse.

4. The data processing system for permitting simultaneous communication between said data processing system and a plurality of input pointing devices of multiple types according to claim 2, wherein said plurality of input pointing devices of multiple types includes a track ball.

5. The data processing system for permitting simultaneous communication between said data processing system and a plurality of input pointing devices of multiple types according to claim 2, wherein said plurality of input pointing devices of multiple types includes a touch display screen.

6. The data processing system for permitting simultaneous communication between said data processing system and a plurality of input pointing devices of multiple types according to claim 2, wherein said plurality of input pointing devices of multiple types includes a pointing stick.

7. The data processing system for permitting simultaneous communication between said data processing system and a plurality of input pointing devices of multiple types according to claim 2, wherein said plurality of input pointing devices of multiple types includes a pen.

* * * * *